3,185,726
NEW METHOD FOR THE PREPARATION OF HIGH ENERGY FUEL

Jean P. Picard, Morristown, and Hans Walter, Dover, N.J., assignors to the United States of America as represented by the Secretary of the Army
No Drawing. Filed Nov. 5, 1962, Ser. No. 235,583
11 Claims. (Cl. 260—467)
(Granted under Title 35 U.S. Code (1952), sec. 266)

The invention described herein may be manufactured and used by or for the Government of the United States for governmental purposes without the payment to us of any royalty thereon.

The present invention relates to a method for the preparation of high energy fuels useful as propellants in guns, rocket motors, and gas generators. Some of the products of this invention may be used also as binders in the manufacture of explosive pellets.

Solid rocket propellant grains normally contain an oxidizing material distributed uniformly throughout a matrix of fuel-binder material and, in addition, liquid and solid additives to enhance the ballistic and physical performance of the propellant. The fuels used must have good casting properties particularly when in admixtures with large amounts of ammonium nitrate or ammonium perchlorate as well as stable aging and burning characteristics when in such admixtures. These requirements make it particularly desirable to use fuels containing part of the oxygen required for their combustion when compounding high impulse propellants.

Accordingly it is an object of this invention to prepare oxygenated fuels having good casting, aging, and burning characteristics when in admixtures with large amounts of oxidizing agents. It is a further object of this invention to develop a method for preparing a new family of oxygenated fuels, individual members of which can be tailored for various specialized uses in propellant compositions.

These objects are realized by a method which, in effect, modifies the explosive compound trimethylolnitromethane trinitrate (also known as 2-nitro-2-(hydroxymethyl)-1,3-propanediol trinitrate) by replacing one or more of its nitrato radicals with organic substituents. These objects are achieved in practice when the intermediate nitrated to produce the aforesaid explosive compound, i.e. trimethylolnitromethane (also known as 2-nitro-2-(hydroxymethyl)-1,3-propanediol), or its reduction product trimethylolaminomethane (also known as 2-amino-2-(hydroxymethyl)-1,3-propanediol, is condensed with a suitable organic agent through the amino group and/or one or more but not all of the hydroxyl groups of the intermediate and then the remaining free hydroxyl groups of the condensed compound esterified with nitric acid or with an acid reacting organic compound containing nitro groups. It is also within the scope of this invention to condense the trihydric intermediate with a polymerizable monomer and then to polymerize the condensed compound prior to nitration of the free alcoholic groups.

The condensing agents used in this invention are organic compounds having a maximum of two radicals reactive with the hydrogen atoms of hydroxyl or amino groups. Such reactive radicals include epoxy, isocyanate and carbonyl chloride radicals as well as chlorine atoms activated by unsaturated linkages or nitro substituents on the hydrocarbon nuclei to which the chlorine atoms are attached. Preferred condensing agents have a maximum of nine carbon atoms and include aromatic as well as aliphatic compounds.

The condensation reactions with the nitrogenous trimethylolmethane intermediate may proceed by means of either an addition reaction or a metathesis reaction. In the former case, the active hydroxyl or amino hydrogen atom adds to the reactive groups replacing it, as for example when epoxy and isocyanate condensing agents are used. In the latter case, the hydroxyl or amino hydrogen atom is split out, for example in the form of hydrogen chloride when the reactive substituent of the condensing agent is a chlorine atom. Inasmuch as both types of condensing agents described above react preferentially with amino hydrogen, they condense in equimolar amounts with trimethylolaminomethane to form the N-substituted compound only.

When the condensation occurs through a chlorine atom, as for example with epichlorohydrin, 2,4-dinitro-1-chlorobutene, or picryl chloride, the reactions are promoted by the presence of a stoichoimetric amount of any acid-bonding material like pyridine, N-dimethylaniline, soda ash or limestone. Efficient cooling is preferable during the course of the reaction. When an epoxy condensing agent is used, the reaction is preferably performed in the presence of an inert liquid such as carbon tetrachloride or methylene chloride to prevent the polymerization of the condensing agent.

Nitration of the hydroxyl groups of the condensed compound may be accomplished by reacting it with compounds containing the nitrogen-oxygen radical, such as nitryl fluoride, nitronium perchlorate, nitric acid, mixed nitric-sulfuric acid, acetyl nitrate, dinitrogen pentoxide, and highly reactive nitro or nitrato organic compounds. Of these the mixed nitric-sulfuric acid is the preferred nitrating mixture.

Further advantages of the present invention can be realized by converting trimethylolnitromethane or trimethylolaminomethane into thermoplastic fuels. This is accomplished by reacting the trihydric intermediate with a condensing agent consisting of a low molecular weight monomer, polymerizing the condensed compound, and subsequently esterifying the free alcoholic groups of the polymer with nitric acid or with an organic compound containing nitro groups.

Monomers especially useful as condensing agents in the preparation of thermoplastic fuels are acrylyl and methacrylyl chlorides. These condensing agents are added to the nitrogenous trimethylolmethane intermediate preferably in the presence of acid absorbing tertiary amines such as N-dimethylaniline or tribenzylamine. The condensed products are then polymerized by heat at a temperature ranging from 60° C. to 100° C. and in the presence of a trace amount of a free radical initiator, such as benzoyl peroxide, methyl ethyl ketone, peracetic acid, or tertiary acetyl peroxide. The reaction mixture is finally cured at a temperature between 125° C. and 300° C. for a time interval determined by the degree of polymerization desired. The cured polymer is then finally ground and nitrated in a manner similar to the nitration of cellulose. However, it has been found that the time of nitration must be increased in order to obtain good penetration of the polymer by the nitrating agent. Finally, the nitrated product is washed until free of acid.

When trimethylolaminomethane is used as intermediate, it is generally desirable to condense it with only equimolar amounts of the acrylyl chloride, thus leaving three hydroxyl groups available for nitration.

Another aspect of the present invention is that trimethylolaminomethane may be reacted directly with acrylic acid followed by polymerization. The ammonium salt type polymer formed is then heated between 160° C. and 190° C., whereby it is transformed to an acidyl amide type polymer and simultaneously cured.

If desired, vinyl polymers may be cross-linked by treating with diisocyanates, thus improving the elastomeric properties of the polymers and also their chemical and heat stabilities by introducing aromatic urea groups which act as intramolecular stabilizers.

Other materials useful as fuels are made by reacting the trihydric intermediates with diisocyanates such as hexamethylene diisocyanate, tolylene 2,4-diisocyanate, nitrophenylene diisocyanate, dinitrophenylene diisocyanate, or 2,4,6-trinitrobenzene diisocyanate. The free hydroxyl radicals of the polyurethanes formed are then esterified with nitric acid.

The following examples are furnished to more clearly describe the present invention. These examples are provided as a means of illustration only and the scope of the invention is not limited thereby.

Example I 121 gms. of trimethylolaminomethane are suspended in 500 ml. of chloroform. Ethylene oxide is then introduced with stirring at reflux temperature, until the weight of the reaction mixture is increased by 165 gms. The chloroform is then evaporated and the condensed product remaining is introduced, with stirring, into a mixture of 500 gms. nitric acid (d. 1.50) and 1000 gms. sulfuric acid (d. 1.8) which is kept at 5° C. After standing for one hour under cooling, the nitration mixture is allowed to stand three additional hours at room temperature. The mixture is then poured on cracked ice and the solid product separated by filtration. Finally the product is dissolved in acetone, neutralized with sodium carbonate, reprecipitated with water and air dried.

The product is a high energy fuel which contains sufficient oxygen to insure self-sustained burning. It may be compounded with rubber or other combustible polymers and may likewise be mixed with oxidizers such as ammonium perchlorate or the like.

The above process may be carried out by using 137 gms. of trimethylolhydroxylaminomethane as the trihydric intermediate.

Example II 60.5 gms. of trimethylolaminomethane are dissolved in 300 ml. water to which 45.3 gms. of acrylic acid are added, whereupon the temperature rises spontaneously to 55–60° C. Then 1.6 gms. peracetic acid are added and the mixture is heated to 80–85° C. Polymerization starts generally after a 15 minute induction period. The resulting viscous polymer is then heated under vacuum in a cylindrical reactor whereby the temperature is gradually raised by means of this external heating to 160–180° C.

When all water has been expelled, the foamy polymer is cooled, crushed, and ground so finely that approximately 50% of it will pass through a 220 mesh screen. Subsequently it is suspended in 350 ml. carbon tetrachloride containing 50 ml. pyridine to which 372 gms. picryl chloride, dissolved in carbon tetrachloride, are added. This mixture is kept under reflux for three hours and finally the carbon tetrachloride is removed by evaporation and the reaction product is thoroughly washed and dried.

The high energy polymer thus obtained is compatible with inorganic oxidants. It is thermoplastic and may be extruded, molded, or cast.

Example III 121 gms. trimethylolaminomethane are suspended in 500 ml. N-dimethylaniline to which 20.5 gms. acrylyl chloride are added. The reaction product is then treated with 277.5 gms. epichlorhydrin which are slowly added with stirring and adequate cooling. The resulting viscous reaction product is subsequently polymerized at 80–90° C. in the presence of 1.6 gms. of benzoyl peroxide. After four hours of curing at 90–100° C., the gel is washed repeatedly with small quantities of 10% hydrochloric acid and water. The purified polymer is then dried in a vacuum oven at 70–75° C.

When all the water has been expelled, the polymer is crushed and ground so finely that approximately 50% of it will pass through a 220 mesh screen. The comminuted polymer is nitrated as shown in Example I except that it is allowed to stand at room temperature for a period of 6–7 hours. The product is a thermoplastic polymer which may be extruded or cast.

Example IV 70 gms. of the nitrated polymer, made according to Example III, are mixed with 400 gms. dry benzene. Then 18 gms. of toluene diisocyanate, dissolved in 500 ml. benzene, are added together with a few drops of tributylamine. The mixture is left at room temperature for three hours with stirring and cooling. The benzene is then removed by evaporation. The product thus obtained may generally be used without the addition of stabilizers.

Example V 303 gms. trimethylolnitromethane are mixed with 242 gms. N-dimethylaniline. Then 181 gms. acrylyl chloride are added dropwise with stirring and cooling. After standing three hours at room temperature, 4.2 ml. peracetic acid are added and polymerization is initiated by heating to about 85° C. The polymer obtained is washed repeatedly with small amounts of 10% hydrochloric acid and water and subsequently dehydrated in a vacuum oven at 70° C.

The dehydrated product is then finely ground until approximately 50% of it will pass through a 300 mesh screen. It is then nitrated as described in Example I except that the reaction nitrating mixture is allowed to stand at room temperature for a period of 6–7 hours.

A thermoplastic polymer is obtained having excellent molding and casting characteristics. Addition of about 1% of 2-nitrodiphenylamine is sufficient to stabilize this high energy polymer fuel.

The polymers obtained by the method of this invention are generally thermoplastic and can be pelletted, billetted, or extruded in the conventional manner. Their rheological and ballistic properties can be further controlled by the addition of the usual non-explosive plasticizers as well as explosive plasticizers such as nitroglycerin, trimethylolnitromethane trinitrate, ethylene nitrate, and the like.

As will be apparent to those skilled in the art, various other modifications of the process disclosed herein can be practiced without departing from the scope of the invention.

What is claimed is:

1. A method of producing a family of high energy fuels comprising condensing a member of the group consisting of trimethylolnitromethane and trimethylolaminomethane by reacting it with a compound selected from the group consisting of acrylic acid; acrylyl chloride; methacrylyl chloride; ethylene oxide; hexamethylene diisocyanate; tolylene 2,4-diisocyanate; nitrophenylene diisocyanate; dinitrophenylene diisocyanate; 2,4,6-trinitrobenzene diisocyanate; epichlorohydrin; and 2,4-dinitro-1-chlorobutene, polymerizing the resultant product and nitrating the polymerized composition by reacting it with a nitrogen-oxygen radical containing compound selected from the group consisting of nitryl fluoride, nitronium perchlorate, nitric acid, mixed nitric and sulfuric acid, acetyl nitrate, dinitrogen pentoxide, and picryl chloride.

2. A polymer produced by the process of claim 1.

3. A process according to claim 1 wherein the condensing agent is ethylene oxide, the nitrogen-oxygen radical containing compound is mixed nitric-sulfuric acid and the condensed compound is trimethylolaminomethane.

4. A polymer produced by the process of claim 3.

5. A process according to claim 1 wherein the condensing agent is acrylic acid, the nitrogen-oxygen radical containing compound is picryl chloride and the condensed compound is trimethylolaminomethane.

6. A polymer produced by the process of claim 5.

7. A process according to claim 1 wherein the condensing agent is epichlorohydrin, the nitrogen-oxygen radical containing compound is nitric acid and the condensed compound is trimethylolnitromethane.

8. A polymer produced by the process of claim 7.

9. A process according to claim 1 wherein the condensing agent is acrylyl chloride, the nitrogen-oxygen radical containing compound is mixed nitric acid-sulfuric acid and the condensed compound is trimethylolnitromethane.

10. A polymer produced by the process of claim 9.

11. A process for preparing a solid oxygenated fuel polymer comprising adding acrylic acid to trimethylolaminomethane in equimolar amounts, polymerizing the addition product, heating the polymerized addition product under vacuum to between 160–180° C. until all water is expelled, comminuting the resulting polymeric material, and finally reacting the comminuted polymeric material with picryl chloride in ratio of 2 to 3 moles of picryl chloride to one mole of trimethylolaminomethane previously used.

No references cited.

CARL D. QUARFORTH, *Primary Examiner.*

REUBEN EPSTEIN, *Examiner.*